(12) United States Patent
Peric et al.

(10) Patent No.: US 9,356,642 B1
(45) Date of Patent: May 31, 2016

(54) SYSTEMS AND METHODS FOR MANAGING RECONFIGURABLE INTEGRATED CIRCUIT APPLICATIONS ON A RADIOFREQUENCY TRANSCEIVER DEVICE

(71) Applicant: QRC, INC., Fredericksburg, VA (US)

(72) Inventors: Sinisa Peric, Bethesda, MD (US); Thomas F. Callahan, III, Spotsylvania, VA (US); Richard Louis Cellucci, Fredericksburg, VA (US)

(73) Assignee: QRC, INC. DBA QRC TECHNOLOGIES, Fredericksburg, VA (US)

( * ) Notice: Subject to any disclaimer, the term of this patent is extended or adjusted under 35 U.S.C. 154(b) by 0 days.

(21) Appl. No.: 14/809,638

(22) Filed: Jul. 27, 2015

(51) Int. Cl.
*H04B 1/40* (2015.01)
(52) U.S. Cl.
CPC ........................................ *H04B 1/40* (2013.01)
(58) Field of Classification Search
CPC ...................................................... H04M 15/90
USPC ....................................................... 455/550.1
See application file for complete search history.

(56) References Cited

U.S. PATENT DOCUMENTS

| | | |
|---|---|---|
| 5,867,535 A | 2/1999 | Phillips et al. |
| 6,078,736 A | 6/2000 | Guccione |
| 6,539,438 B1 | 3/2003 | Ledzius et al. |
| 7,320,062 B2 * | 1/2008 | Master et al. .................... 712/15 |
| 7,937,601 B2 | 5/2011 | Bakker et al. |
| 8,364,946 B2 * | 1/2013 | Ishebabi ....................... 713/100 |
| 8,677,378 B2 | 3/2014 | Murotake et al. |
| 8,763,004 B1 | 6/2014 | Callahan, III |
| 8,850,411 B2 | 9/2014 | Kelem et al. |

OTHER PUBLICATIONS

Slade, et al., "Reconfigurable Computing Application Frameworks", Brigham Young University, 10 pages, (2003).

* cited by examiner

*Primary Examiner* — Tuan H Nguyen
(74) *Attorney, Agent, or Firm* — The Marbury Law Group, PLLC (57) ABSTRACT

A radiofrequency transceiver device includes at least one reconfigurable integrated circuit (RIC) and a system controller that is able to reconfigure the at least one RIC to perform specific processing tasks. The specific processing tasks may be related to processing at least one radiofrequency signal that is received by, stored on, retrieved from and/or transmitted by the radiofrequency transceiver device. Embodiments may also include one or more reconfigurable integrated circuit applications (RIC Apps) that may be executed, at least in part, on the at least one RIC.

20 Claims, 9 Drawing Sheets

SYSTEMS AND METHODS FOR MANAGING RECONFIGURABLE INTEGRATED CIRCUIT APPLICATIONS ON A RADIOFREQUENCY TRANSCEIVER DEVICE

BACKGROUND

Various radiofrequency (RF) transceiver devices are known which are capable of receiving and/or transmitting RF signals. One example is a radiofrequency digitization and collection system (RFDCS) that may be used to collect, store, retrieve and/or transmit radiofrequency signals.

An example of an RFDCS is described in U.S. Pat. No. 8,763,004, which is incorporated by reference herein. An RFDCS may typically include a collection system for receiving raw analog RF signals and converting these signals into digital RF signals, a data storage/retrieval system (e.g., hard drive) that stores/retrieves collected RF signals in the form of RF digital information (RDI) files, and a transmission system for converting a processed and/or retrieved RF digital signal into an analog RF signal and transmitting the converted RF analog signal (e.g., via an antenna or wired RF connection).

The users of these systems may often desire to manipulate the raw RF signals captured by the system or to perform other transformations to convert the signals to a more useful form. However, these operations may be computationally intensive and can overwhelm system resources.

SUMMARY

The various embodiments include radiofrequency transceiver devices that include at least one reconfigurable integrated circuit (RIC) and a system controller that is able to reconfigure at least one RIC to perform specific processing tasks. The specific processing tasks may be related to processing at least one radiofrequency signal that is received by, stored on, retrieved from and/or transmitted by the radiofrequency transceiver device. Embodiments may also include one or more reconfigurable integrated circuit applications (RIC Apps) that may be executed, at least in part, on the at least one RIC.

In one embodiment, a method of managing a reconfigurable integrated circuit application (RIC app) in an RIC app storage and retrieval space (RIC App Space) including one or more RIC apps on a radiofrequency transceiver device having one or more reconfigurable integrated circuits (RICs) and a system controller includes launching an RIC app from the RIC App Space on the radiofrequency transceiver device based on a request, creating an execution environment, by the system controller, for the RIC app, where creating the execution environment includes reconfiguring the at least one RIC, by the system controller, to execute the RIC app, and executing the RIC app in the created execution environment, where executing the RIC app includes processing at least one radiofrequency signal using the at least one RIC.

Various embodiments include radiofrequency transceiver devices configured to perform operations of the embodiment methods disclosed herein. Various embodiments also include radiofrequency transceiver devices including means for performing functions of the embodiment methods disclosed herein. Various embodiments also include non-transitory processor-readable storage media having stored thereon processor-executable instructions configured to cause a processor to perform operations of the embodiment methods disclosed herein.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or similar parts. References made to particular examples and implementations are for illustrative purposes, and are not intended to limit the scope of the invention or the claims.

As used herein, a "radiofrequency transceiver device" includes devices that include a receiver for receiving RF signals and/or a transmitter for transmitting RF signals. For example, a radiofrequency transceiver device may be a radiofrequency digitization and collection system (RFDCS) that is capable of receiving, storing, retrieving and transmitting RF signals. It will be understood that in other embodiments, a radiofrequency transceiver device may include devices that only receive RF signals as well as devices that only transmit RF signals.

As used herein, a "reconfigurable integrated circuit" or "RIC" are used interchangeably and refer to an integrated circuit or processor that can be reconfigured after manufacturing to make changes to the datapath or bitstream of the circuit. Examples of reconfigurable integrated circuits include field-programmable gate arrays (FPGAs) and complex programmable logic devices (CPLD).

As used herein, the terms "transform(s)" or "transformation(s)" are used interchangeably and refer to the modification, manipulation, or various other types of processing performed on a RF signal that changes the RF signal into a new form. For example, noise reduction, desired signal amplification, normalization, and various filters may be used to perform a transform on a signal to change the signal into a new form. In the various embodiments, transforms may be performed using various hardware and software components.

As used herein, the terms "app(s)" or "application(s)" are used interchangeably and refer to programs, code, processes, or operations stored on a radiofrequency transceiver device that, among other things, processes RF signals (e.g., implement transforms on RF signals) during any of the reception of the RF signals, storage of the RF signals, retrieval of the RF signals, and transmission of the RF signals. Also, as used herein, the term "App Space" refers to a collection of apps stored on the radiofrequency transceiver device that may be used to process RF signals, such as by performing transforms of RF signals.

In overview, various embodiments relate to a radiofrequency transceiver device that includes at least one reconfigurable integrated circuit (RIC) and a system controller that is able to reconfigure the at least one RIC to perform specific processing tasks. The specific processing tasks may be related to processing of a radiofrequency signal, such as a digitized radiofrequency signal. The processing of the radiofrequency signal may include performing particular "transforms" on radiofrequency signals that may be received by, stored on, retrieved from and/or transmitted by the radiofrequency transceiver device. The reconfigurable integrated circuit (RIC) may be a field programmable gate array (FPGA), a complex programmable logic device (CPLD), or a similar reconfigurable integrated circuit.

Various embodiments may include one or more RIC applications (RIC Apps) that may be executed, at least in part, on at least one RIC. The RIC apps may be managed by a system controller, which may be implemented in a system area of a CPU of the radiofrequency transceiver device. The system controller may be configured to launch an RIC app from an RIC app storage and retrieval space (RIC App Space) in response to a user request and create an execution environment for the RIC App, where creating an execution environment includes reconfiguring at least one RIC to execute the RIC app. The at least one RIC may be reconfigured using configuration data associated with the RIC app. Reconfiguring the RIC may include interchanging one or more stored semiconductor IP cores, for example. The RIC App may be executed in the created execution environment, which may include processing RF signals using the reconfigured RIC.

The system controller may control access to privileges and resources of the transceiver device, including the reconfiguration and use of at least one RIC by the RIC apps. In various embodiments, the system controller may be configured to register each of the RIC apps when they are first installed on the transceiver device. In one embodiment, the system controller may register each RIC app by determining whether a particular RIC app can run on the radiofrequency transceiver device, add the RIC app to the RIC App Space when it is determined that the RIC app can run on the radiofrequency transceiver device and not add the RIC app to the RIC App space when it is determined that the RIC app cannot run on the radiofrequency transceiver device. The system controller may not register a particular RIC app in response to determining that, for example, RIC configuration data included in the RIC app is not compatible with the radiofrequency transceiver device, the RIC app is not signed, the RIC app is not licensed and/or a checksum algorithm run on the RIC app indicates at least one error.

In embodiments, the system controller may be configured to manage multiple RIC Apps on the radiofrequency transceiver device. For example, a first RIC app may execute in a first execution environment, and the system controller may be configured to launch at least one additional RIC app from the RIC App Space on the radiofrequency transceiver device based on a request. The system controller may be configured to create at least one additional execution environment for the at least one additional RIC app, where the at least one additional execution environment may be created by reconfiguring the at least one RIC to execute the at least one additional RIC app using configuration data associated with the at least one additional RIC app. The system controller may be configured to execute the at least one additional RIC app in the at least one additional execution environment on the at least one RIC.

In some embodiments, the system controller may be configured to determine, for each RIC app that is launched, whether sufficient resources exist to execute the RIC app on the at least one RIC, where the system controller creates an execution environment only in response to a determination that sufficient resources exist to execute the RIC app on the at least one RIC. For example, the system controller may determine whether sufficient space exists on the at least one RIC to reconfigure the RIC based on the RIC configuration data associated with the particular RIC app.

In embodiments, a request to launch an RIC app may be based on a user input or may be made by another application (app) that is running on the radiofrequency transceiver device. For example, a first app may send a request to the system controller to launch a particular RIC app from the RIC app space (e.g., to perform a particular processing task on a radiofrequency signal). The first app may identify the at least one radiofrequency signal to be processed by the RIC app using the at least one RIC. The RIC app may send the radiofrequency signal processed by the RIC app to the first app and/or may provide data derived from the processing of the of the radiofrequency signal to the first app.

Thus, various embodiments may enable users of a radiofrequency transceiver device to utilize real-time digital signal processing by running various specialized applications on integrated circuits configured to perform particular processing tasks without compromising the core system functions of the transceiver device, thereby promoting dynamic "on-the-fly" processing of RF signals without compromising the user's overall experience.

Figure 1:
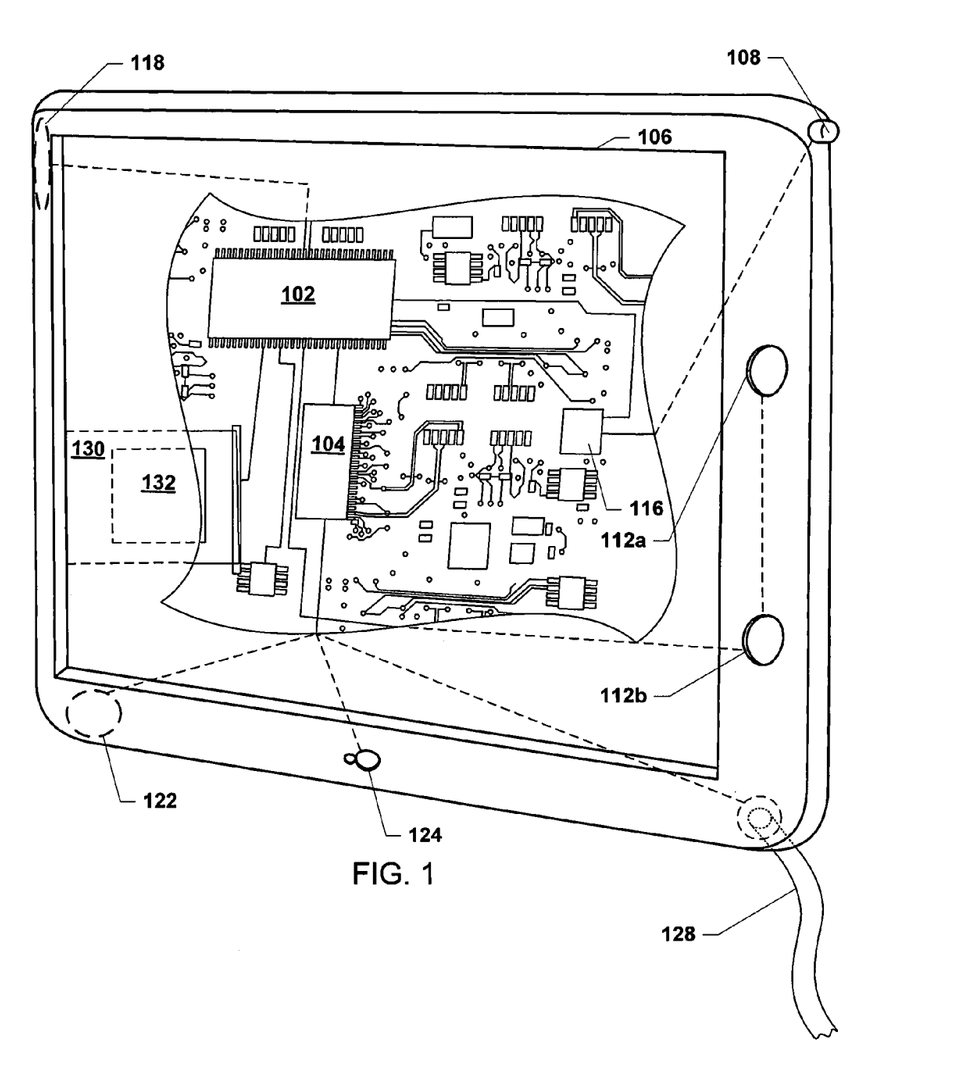
FIG. 1 is an illustration of an example radiofrequency transceiver device according to an embodiment.

The various embodiments may be implemented in a radiofrequency transceiver device 100, such as a radiofrequency digitization and collection system (RFDCS), an example of which is illustrated in FIG. 1. For example, the transceiver device (e.g., RFDCS) 100 may include a processor 102 (e.g., a CPU) coupled to internal memory 104. Internal memory 104 may be volatile or non-volatile memory, and may also be secure and/or encrypted memory, or unsecure and/or unencrypted memory, or any combination thereof. The processor 102 may also be coupled to a touch screen display panel 106, such as a resistive-sensing touch screen, capacitive-sensing touch screen infrared sensing touch screen, or the like. Additionally, the display of the device 100 need not have touch screen capability. Additionally, the device 100 may have one or more antenna 108 for sending and receiving electromagnetic radiation (e.g., RF signals) that may be connected to a wireless data link and/or cellular telephone transceiver 116 coupled to the processor 102. In another embodiment, the device 100 may also receive and send RF signals over a wired RF connection 128, such as via a coaxial cable or other RF input/output feature. The device 100 may also include physical buttons 112a and 112b for receiving user inputs. The device 100 may also include a power button 118 for turning the transceiver device 100 on and off. Additionally, the transceiver device 100 may include a microphone 124 for receiving sound. The transceiver device 100 may also include a speaker 122 for converting audio signals into audible sound.

As shown in FIG. 1, a transceiver device 100 may also include one or more reconfigurable integrated circuit (RIC) modules 130 including one or more reconfigurable integrated circuits (RICs) 132. The reconfigurable integrated circuit (RIC) 132 may be a field programmable gate array (FPGA), a complex programmable logic device (CPLD), or a similar reconfigurable integrated circuit which may be coupled to a processor 102 (e.g., CPU) of the radiofrequency transceiver device 100. Although a single RIC 132 is shown in FIG. 1, it will be understood that a transceiver device 100 may include a plurality of RICs and/or RIC modules. In embodiments, the RIC module 130 may be an expansion card (e.g., a PCI Express card) that may plug into a slot 134 on the motherboard of the radiofrequency transceiver device 100, as schematically illustrated in FIG. 1. Other configurations may also be utilized.

Figure 2:
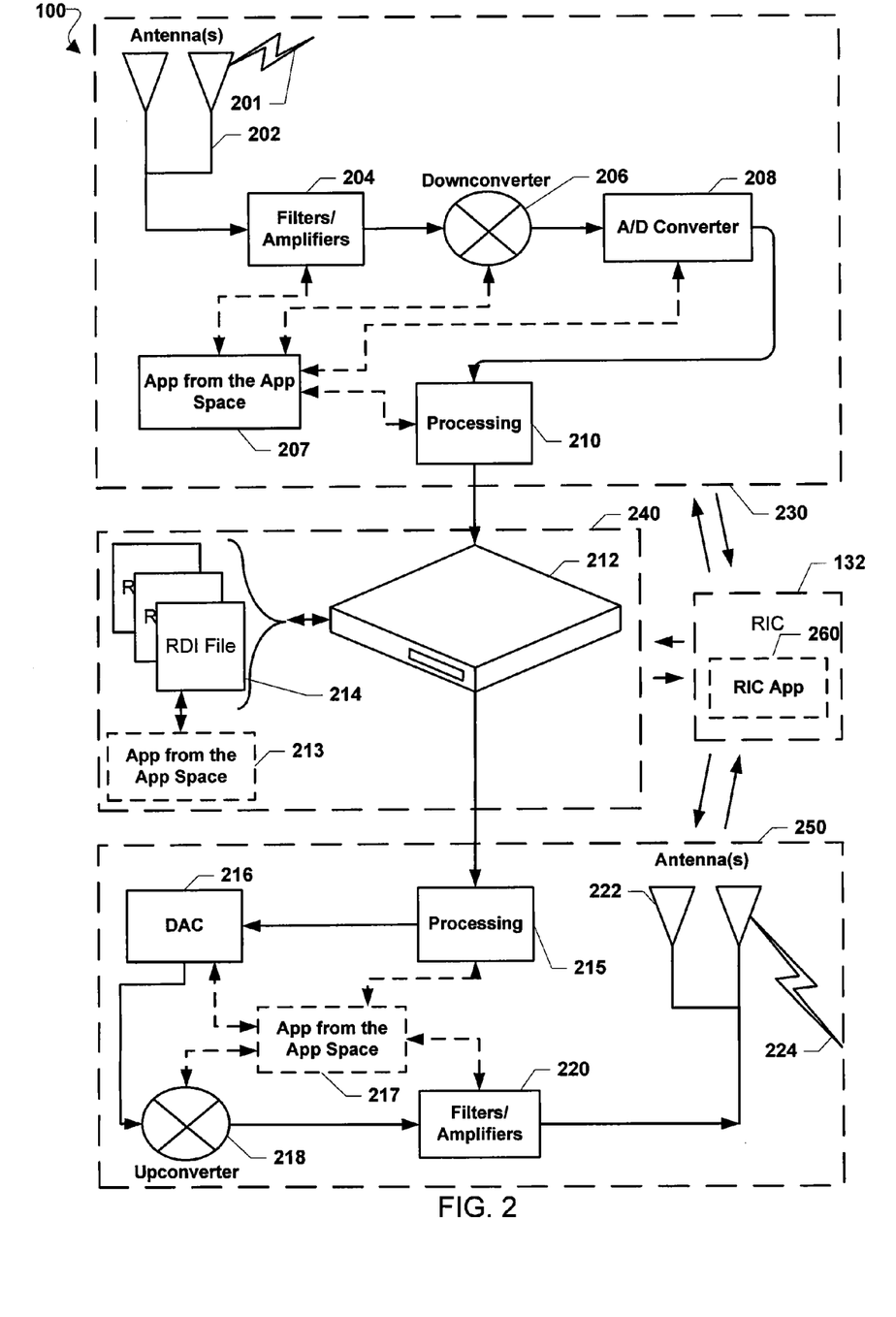
FIG. 2 is a block component diagram of an example RF digital recording, storing, retrieving, and transmission process according to an embodiment.

FIG. 2 is a component block diagram illustrating components of a radiofrequency transceiver device 100 according to an embodiment. The radiofrequency transceiver device 100 may be a radiofrequency digitization and collection system (RFDCS) that includes a collection component 230, a data storage/retrieval component 240, and a transmission component 250, such as described in U.S. Pat. No. 8,763,004, which has been incorporated by reference herein. The radiofrequency transceiver device 100 in this embodiment also includes at least one reconfigurable integrated circuit (RIC) 132 which may be operatively coupled to each of the collection component 230, the data storage/retrieval component 240 and the transmission component 250 of the transceiver device 100. At least one RIC app 260 may execute on the RIC 132 to perform particular processing tasks, including processing of radiofrequency signals that may be received by the collection component 230, stored/retrieved by the data storage/retrieval component 240 and/or transmitted by the transmission component 250, as is described further below.

In an embodiment, the collection component 230 of the radiofrequency transceiver device 100 (e.g., RFDCS) may receive RF signals. The collection component 230 may include various sub-components, such as a filters/amplifiers unit 204, a downconverter 206, an analog-to-digital converter (i.e., A/D converter 208), and a processing unit 210. One or more antennas 202 may wirelessly receive an analog RF signal 201, such as a radio wave. In another embodiment (not shown), the collection system 230 may receive RF signals directly through a wired RF connection, such as a coaxial cable. The filters/amplifiers unit 204 (e.g., a high-pass filter unit) may filter and/or amplify the captured analog RF signal 201. The filtered RF signal may be passed to a downconverter 206 and then to the A/D converter 208. The A/D converter 208 may use various techniques to convert the analog signal into a digital signal. After finishing converting the analog RF signal 201 to a digital RF signal, the A/D converter 208 may pass the converted digital signal to a processing unit 210 for additional processing. The processed digital signal may be sent for storage and later retrieval in the data storage/retrieval system 240.

As described in U.S. Pat. No. 8,763,004, the radiofrequency transceiver device 100 may include one or more applications (apps) 207 that may be used to control and/or modify the operation of the collection component 230. In other words, the app 207 may modify the behavior of any combination of the various sub-components 204, 206, 208, and 210 of the collection system 230 and may cause any of the sub-components 204, 206, 208, and 210 to apply various transforms to the analog RF signal 201 as it is converted from analog to digital. For example, the app 207 may cause the A/D converter 208 to apply various offsets and skewing algorithms that, among other things, may adjust the sampling rate of converted digital signals. In another example, the app 207 may decimate the analog RF signal 201 for easier processing and storage/retrieval using the processing unit 210. In yet another example, the app 207 may configure the downconverter 206 and/or the filters/amplifiers unit to control frequencies of a received analog RF signal 201. Various apps 207 may be stored in a memory area (App Space) that is separate from the system area of the device 100.

The apps 207 from the App Space may be distinguishable from the RIC app(s) 260 in that the apps 207 may execute on a conventional (i.e., non-reconfigurable) microprocessor of the radiofrequency transceiver device 100. In contrast, the RIC app(s) 260 execute, at least on part, on an RIC 132 and may include configuration data for reconfiguring an RIC 132 as described further below.

In embodiments, data may be exchanged between the collection component 230 and the RIC 260, as illustrated by arrows in FIG. 2. In some embodiments, radiofrequency signals that may be converted to digital signals by the A/D converter 208 and optionally processed by the processing unit 210 may be sent to the RIC 132 to be processed using at least one RIC app 260. The RIC 132 may be reconfigured to perform one or more specific processing tasks on the received radiofrequency signals, such as performing a transform on the radiofrequency signals. For example, the RIC 132 may be reconfigured to perform one or more processing tasks on the radiofrequency signals, such as filtering, amplification, noise-reduction, normalization, etc. The particular processing task(s) performed by the RIC 132 may include computationally-intensive signal processing that may not otherwise be practical to perform in real-time (e.g., using a conventional microprocessor) without overwhelming system resources. In some embodiments, the radiofrequency signals processed using the RIC 132 may be sent to the data storage/retrieval component 240 for storage and later retrieval and/or to the transmission component 250 for transmitting the processed RF signals. In some embodiments, the processed radiofrequency signals may be sent from the RIC 312 back to the collection component 230 of the transceiver device 100, for example, for further processing of the signals by the processing unit 210.

The data storage/retrieval component 240 of the transceiver device 100 may include a persistent memory 212 (e.g., a hard drive or other non-volatile memory component, such as a Secure Digital (SD) memory card), as shown in FIG. 2. In embodiments, the persistent memory 212 may maintain processed digital signals in the form of RF digital information (RDI) files 214. RDI files 214 may contain digital representations of received RF signal information. In an embodiment, the contents of a "RF Digital Information (RDI)" file may be in many formats, but may generally include an in-phase amplitude measurement of the signal (I) and generally (but not necessarily) also a 90 degree phase-shifted (quadrature) amplitude measurement of the signal (Q). Additional "meta data" that specifies pertinent information about the IQ data may also be present in RDI files 214.

In some embodiments, one or more apps 213 included in the App Space may optionally perform transformations on the digital signal stored in the RDI files 214. For example, an app 213 may increase the signal's gain or may apply other filters, effects, and other transforms. In another embodiment, the app 213 may combine multiple RDI Files into a resulting RDI File for use by adding the signals together with or without additional signal manipulation. In another embodiment, the app 213 may apply other transforms typical of offline signal processing (i.e., computationally intensive signal processing that may not be practical to implement in real-time). In some embodiments, the digitized radiofrequency signal(s) stored on the data storage/retrieval component 240 (e.g., in persistent memory 212) may be retrieved and sent to the RIC 132 to perform particular processing tasks using one or more RIC apps 260. The RIC 132 may send the processed digitized RF signal back to the data storage/retrieval component 240 for further processing and/or storage. In some cases, the RIC 132 may send the processed digitized RF signal to the transmission component 250 for transmitting the signal.

The transmission component 250 of the radiofrequency transceiver device 100 may include a processing unit 215, a digital-to-analog converter (DAC 216), an upconverter 218, a filters/amplifiers unit 220, and one or more antennas for transmitting an analog signal 224. In preparation for transmission (i.e., playback), a processing unit 215 may process the digital signal received from the persistent memory 212 using various known techniques. In one embodiment, the processing unit 210 and the processing unit 215 may be the same processing unit (e.g., a central-processing unit (CPU) or a digital signal processor (DSP)). In another embodiment, the processing units 210, 215 may be separate components (e.g., the processing unit 210 may be a DSP and the processing unit 215 may be a CPU). In yet another embodiment, the processing units 210, 215 may be one or more cores in one or more multi-core processing units, such as a quad- or dual-core DSP. In some embodiments, the functions of one or both of the processing units 210, 215 may be performed, in whole or in part, by the at least one RIC 132.

The processing unit 215 and/or the RIC 132 may send the processed digital signal to the DAC 216 of the transmission component 250. The DAC 216 may convert the digital signal into an analog signal. After converting the digital signal, the DAC 216 may send the converted digital signal to an upconverter 218, which may apply various other transforms to the converted analog signal before sending the converted analog signal to a filters/amplifiers unit 220. The filters/amplifiers unit 220 may apply additional transforms to the converted analog signal and may send the converted analog signal to the antenna(s) 222 for transmission as an analog signal 224. In another embodiment (not shown), the transmission component 250 may transmit the converted analog signal through a wired RF connection, such as a coaxial cable.

As described in U.S. Pat. No. 8,763,004, one or more apps 217 may modify the behavior of any of the processing unit 215, DAC 216, upconverter 218, and filters/amplifiers unit 220 of the transmission component 250 to change various characteristics of the radiofrequency signal processed by any combination of the processing unit 215, DAC 216, upconverter 218, and filters/amplifiers unit 220 in the transmission component 250. At least a portion of the processing of the radiofrequency signal for transmission by the transmission component 250 may be performed by an RIC app 260 running on the RIC 132.

Thus, in the various embodiments, one or more RIC apps 260 which execute, at least in part, on an RIC 132 may perform various processing tasks during the various stages of signal processing. The RIC app(s) 260 may operate in conjunction with other apps, such as apps 207, 213, 217, operating on the radiofrequency transceiver device 100. For example, an app 207, 213, 217 may request or instruct an RIC app 260 to perform a particular processing task on at least one identified radiofrequency signal using the RIC 132. The RIC app 260 may process the identified radiofrequency signal(s) using the RIC 132 and may send the processed signal(s) to the requesting app or to a different app for additional processing. For example, an RIC app 260 may perform a transform on a particular radiofrequency signal (e.g., digitized stream), with or without preserving the original radiofrequency signal data. In some embodiments, the RIC app 260 may derive data from the processing of one or more radiofrequency signals, and may provide the derived data to the requesting app or to a different app.

In embodiments, the various apps (e.g., apps 207, 213 and/or 217 and one or more RIC apps 260) executing on the radiofrequency transceiver device 100 may communicate with one another at the level of interrupts, events, triggers, scalars (e.g., probability measurements, estimates, etc.), digital streams (e.g., demodulated data), messages, etc.

Figure 3A:
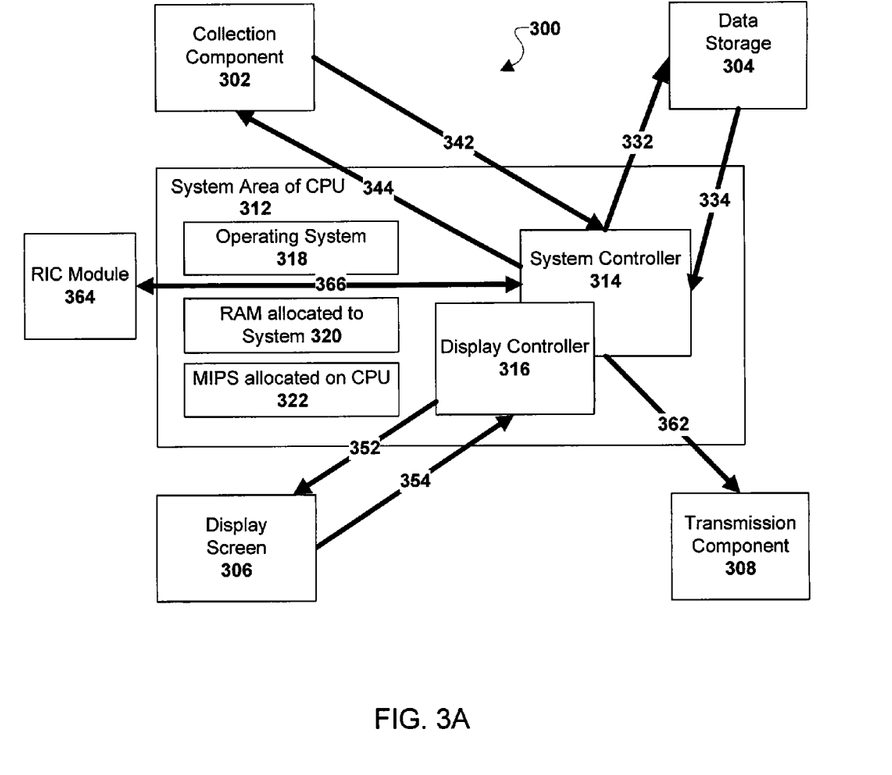
FIG. 3A is a system diagram of an example radiofrequency transceiver device having a reconfigurable integrated circuit (RIC) module according to an embodiment.
Figure 3B:
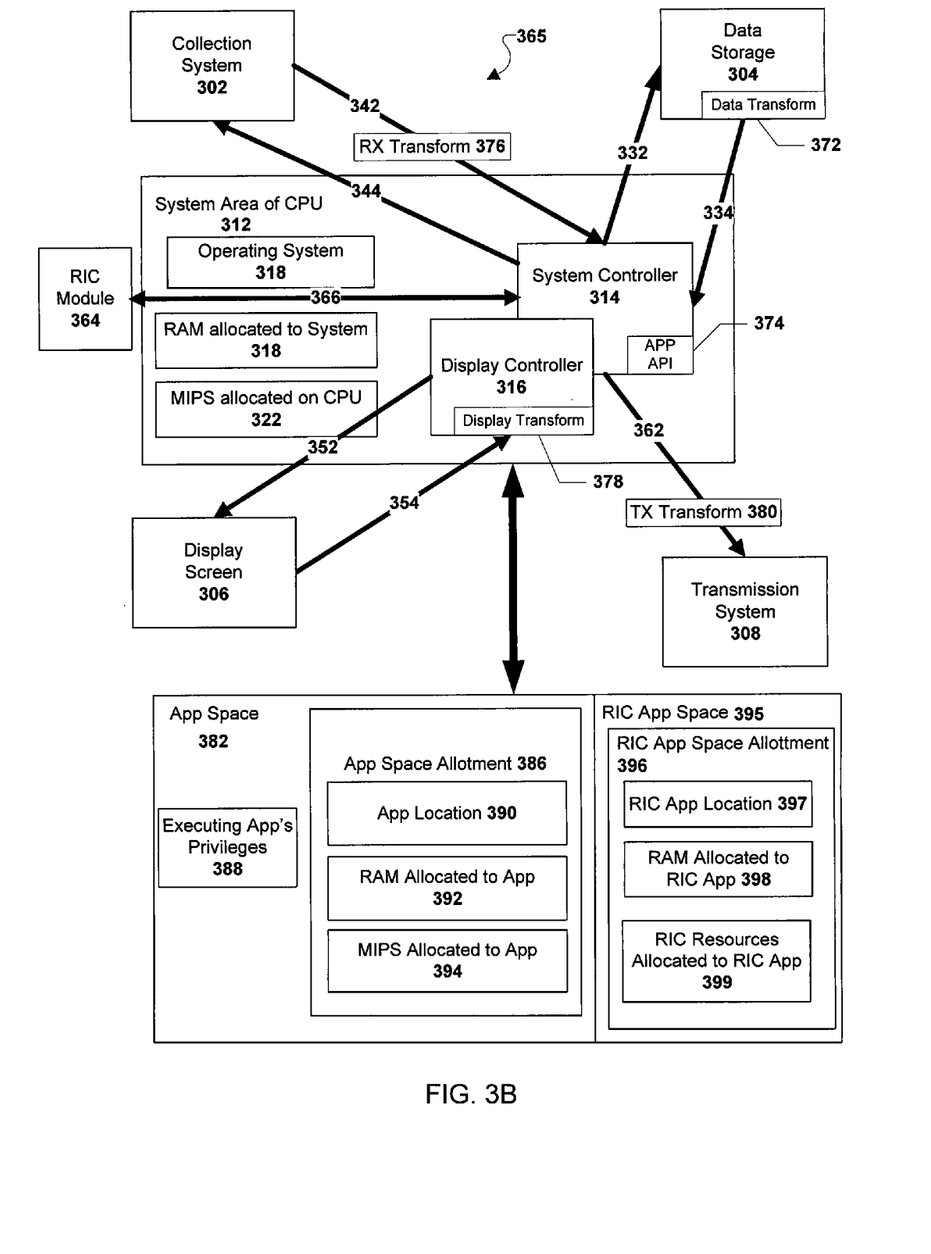
FIG. 3B is a system diagram of an example radiofrequency transceiver device that includes an RIC module and an RIC App Space according to an embodiment.

FIGS. 3A-3B are system diagrams 300, 365 that illustrate the management of signal processing on an embodiment radiofrequency transceiver device 100 (e.g., an RFDCS).

FIG. 3A illustrates multiple systems included on an embodiment radiofrequency transceiver device 100. In an embodiment, the radiofrequency transceiver device 100 may include a system area 312 of the central processing unit (CPU), which may have a higher priority/security than other systems included in the radiofrequency transceiver device 100. The system area 312 may implement an operating system 318, which may function as a typical high-level operating system and may interact with and manage various hardware and software systems included in the radiofrequency transceiver device 100. The system area 312 may also include records 320, 322 indicating the random access memory (RAM) and MIPS, respectively, allocated to the system area 312. The system area 312 may also include a display controller 316 used for operating a display screen 306.

In an embodiment, the system area 312 may also include a system controller 314 that may coordinate and manage the operations of a collection component 302, a data storage/retrieval component 304, a transmission component 308 and a reconfigurable integrated circuit (RIC) module 364. The system controller 314 may send various signals 344 to the collection system 302, including command and control signals. The collection component may function similarly to the collection component 230 described above with reference to FIG. 2 and may provide frequency downconversion and converting of an analog signal to a digital signal.

In a further embodiment, the system controller 314 may include one or more processing cores (not shown). The system controller 314 may utilize the one or more processing cores to implement apps within the App Space or to control and/or transform various aspects of the transceiver device 100, such as RF signal collection, storage, retrieval, and transmission (i.e., playback). The system controller 314 may allocate specific resources—such as specific processing units, cores, and/or other resources—to one or more apps in the App Space. For example, at least one core may be dedicated to an app performing transforms on (i.e., processing) RF signals being collected with the collection component 230 while the core system functions may utilize the other cores to ensure consist and reliable performance of various other components of the transceiver device 100. Thus, in an embodiment, the system controller 314 may leverage the one or more cores to perform real-time processing.

In another embodiment, the collection component 302 may send raw IQ data 342 to the system controller 314, which may send a signal 332 that includes the raw IQ data 342 to the data storage/retrieval component 304. The signal 332 may also be sent using the VITA Radio Transport (VRT) standard.

In yet another embodiment, the data storage/retrieval component 304 may be similar to the data storage/retrieval component 240 described above with reference to FIG. 2. The data storage/retrieval component 304 may store the signal 332 as an RDI file in various storage devices, such as a hard drive or solid state drive. Additionally, the data storage/retrieval component 304 may include larger data storage space via eSATA, USB or other high data rate bus storage. The data storage/retrieval component 304 may also retrieve and send the stored signal back to the system controller 314 in a signal 334.

In another embodiment, the system controller 314 may send a signal 362 to a transmission component 308, which may be analogous to the transmission component 250 described above with reference to FIG. 2. The signal 362 may also include raw IQ data and command and control signals. The transmission component 308 may include a raw IQ transmitter for transmitting signals.

The system controller 314 in this embodiment may also control the operation of an RIC module 364. The RIC module 364 may be a circuit board or card that includes at least one RIC (e.g., a FPGA or CPLD), which may be analogous to the RIC module 130 described above with reference to FIG. 1. One or more RIC apps may execute on the at least one RIC of the RIC module 364, as described above with reference to FIG. 2. The system controller 314 may control the implementation of the one or more RIC apps on the RIC module 364, including the reconfiguring of one or more RICs for executing an RIC app, and may allocate specific resources—such as RICs or portions thereof—to one or more of the RIC apps.

The system controller 314 may exchange various signals 366 with the RIC module 364, including command and control signals. The system controller 314 may also control the transfer of IQ data to and from the RIC module 364, such as by direct memory access (DMA) transfer.

In embodiments, the system controller 314 may be in communication with a display controller 316. The system controller 314 may send various instructions to the display controller to affect what is displayed on a display screen 306. For example, the display controller 316 may send a signal 352 including an instruction to draw a particular image, and the display screen may send a return signal 354 that includes a user's command control (i.e., a user's input when the display screen implements touchscreen capabilities).

In the various embodiments, as illustrated in FIG. 3B, a radiofrequency transceiver device 100 may include components in addition to those described above with reference to FIG. 3A. These additional components may facilitate the incorporation of an App Space 382 in communication with the system area 312 and the implementation of apps in the App Space 382 to perform various transforms on signals in various systems operating on the device.

In an embodiment, the App Space 382 may have a lower security/priority than the system area 312 in order to protect the core system functions performed in the system area 312. In other words, the App Space 382 may be held in a separate and secure area that cannot interfere with the core system functions in the system area 312, thus protecting the integrity and security of the core system functions. Any apps executing on the radiofrequency transceiver device 100 may also be confined to this separate and secure space for similar reasons.

The App Space 382 may include a record 388 of one or more executing apps' privileges. For example, the App Space 382 may maintain that a particular app has RF signal collection control access privileges, thereby allowing the particular app to apply transforms during the RF signal collection process in the collection component 302. The App Space 382 may also include a record 386 of the App Space allotment. The record 386 may indicate where the apps are stored (i.e., the app location 390), which may be a special directory in the OS drive, the memory available to the apps (i.e., allocated RAM 392), and the MIPS allocated to the apps (i.e., allocated MIPS 394). Thus, in an embodiment, the App Space 382 may manage apps and their available resources.

Also illustrated in FIG. 3B is an RIC App Space 395 for RIC apps which may be analogous to the App Space 382 described above. In some embodiments, the App Space 382 and the RIC App Space 395 may be co-extensive on the radiofrequency transceiver device 100 (e.g., the RIC App Space 395 may be located in the same area of the device 100 as App Space 382 and/or may be considered a subset of App Space 382). In other embodiments, the RIC App Space 395 may be separate and distinct from App Space 382, and may be located in a separate area of the device 100 from the App Space 382. The RIC App Space 395 may include a record 396 of the RIC App Space allotment. The record 396 may indicate where the RIC apps are stored (i.e., the RIC app location 397). The record 396 may also indicate the memory (e.g., allocated RAM 398) available to the RIC apps. For example, a portion of the main system memory (e.g., RAM) may be allocated for Direct Memory Access transfers of data between the system area of the CPU 312 and an RIC app that is executing on the RIC module 364. The record 396 may also indicate the resources on the RIC module (e.g., RICs or portions thereof) allocated to the RIC apps (i.e., allocated RIC resources 399).

In various embodiments, the system controller 314 may include an app application programming interface (i.e. app API 374). The app API 374 may include various libraries, functions, system calls, etc. that may allow the apps in the App Space 382 and/or the RIC apps in the RIC App Space 395 to perform transforms in various systems or various stages of signal processing. In a further embodiment, the app API 374 may enable an app/RIC app to perform transforms of signals that the collection system obtains (i.e., Rx transforms 376), for example, by allowing the app to affect how the A/D converter 208 operates in FIG. 2. In another embodiment, using the app API 374, the app/RIC app may apply data transforms 372 in the data storage/retrieval system 304 by performing offline/post-processing of the signal while the signal is stored in an RDI file. Similarly, the app/RIC app may perform transforms to signals during play back (i.e., Tx transforms 380).

In another embodiment, the app/RIC app may use the app API 374 to communicate with the display controller 316 to perform various display transforms 378. Display transforms 378 may include displaying various app-specific items on the display screen 306, such as customized user interfaces, overlays, etc. For example, an app/RIC app may cause an app-specific user interface to be displayed on the display screen 306 for use by the user.

In yet another embodiment, the App Space 382/RIC App Space 395 may use the app API 374 to display a navigable, interactive display on the display screen. Such a display may feature the one or more apps included in the App Space 382 and/or one the one or more RIC apps included in the RIC App Space 395 and may enable a user to browse and select the apps or RIC apps for execution on the radiofrequency transceiver device 100.

In other embodiments, a first app API 374 may be used by apps included in the App Space 382 as described above and a second API (i.e., an RIC app API, not shown in FIG. 3B) may be used by RIC apps included in the RIC App Space 395 and may perform analogous functions to the first app API 374.

Figure 4:
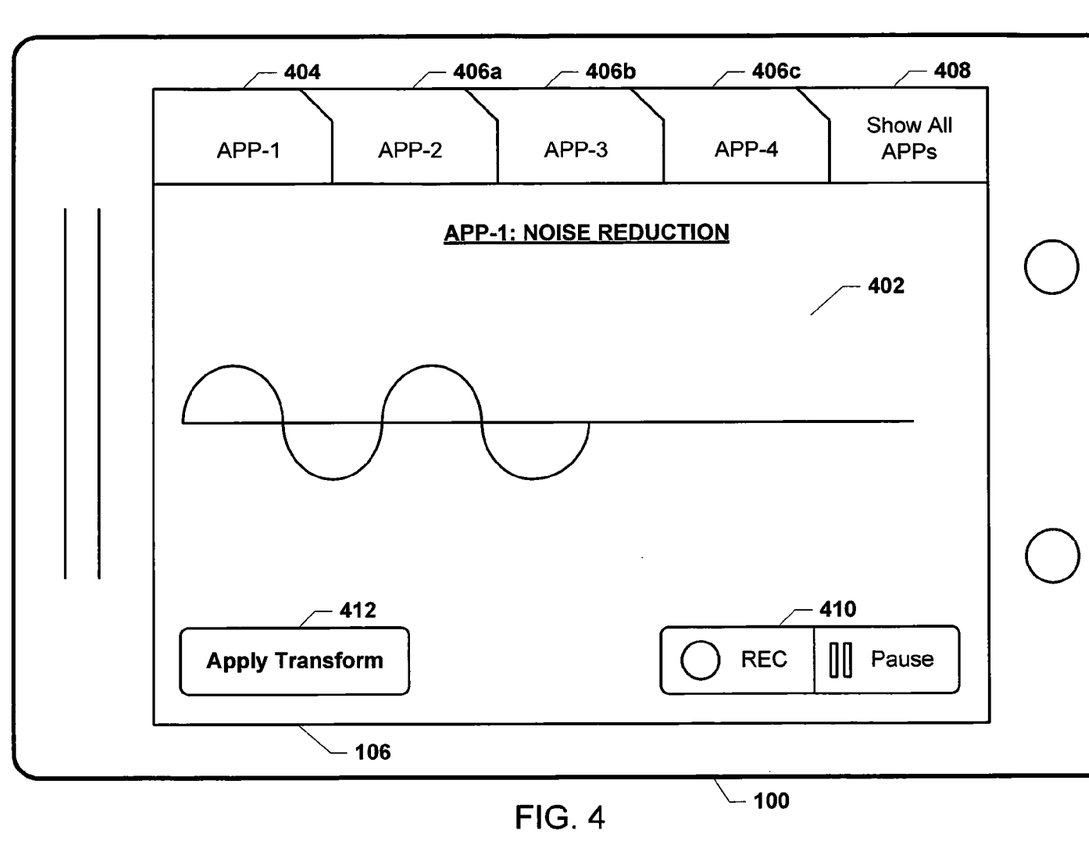
FIG. 4 is an illustration of an example radiofrequency transceiver device displaying app-specific displays according to an embodiment.

FIG. 4 illustrates an embodiment RFDCS displaying an app-specific user interface.

A display panel 106 of a radiofrequency transceiver device 100 (e.g., RFDCS) may include various app-specific user interfaces. In an embodiment, when an app in the App Space 382 and/or an RIC app in the RIC App Space 395 is successfully launched, an app-specific user interface 402 associated with the launched app may be displayed on the display panel 106. For example, if a noise reducing app (i.e., APP-1 404) is successfully launched, the display panel 106 may display the app-specific user interface 402 associated with the noise-reducing app. The app-specific user interface 402 may include various visualizations, displays, graphics, texts, and other imagery. The app-specific user interface 402 may also include features with which the user may interact, such as real or virtual knobs, buttons, sliders, radio buttons, scroll bars, etc. For example, the app-specific user interface 402 may display a record button 410 that the user may select to begin recording RF signals. The app-specific user interface 402 may also include other buttons or features, such as an "apply transform" button 412 which, in this example, may apply noise-reducing filtering of an RF signal being recorded.

In another embodiment, the display panel 106 may include a navigation bar or other feature (e.g., the "Show All APPs" tab 408) that enables a user to browse and select various apps included in the App Space 382 and/or the RIC App Space 395. In one embodiment, multiple apps may be operating on the radiofrequency transceiver device 100 simultaneously, but only one app may be "featured" on the display panel 106. As illustrated in FIG. 4, APP-1 404 is featured as evidenced by its tab being highlighted in the navigation bar. In yet another embodiment, the display panel 106 may enable the user to switch which app is featured (i.e., which app's app-specific user interface is displayed). For example, the user may select any one of the other apps in the navigation bar by selecting, for example, the APP-2 tab 406a, the APP-3 tab 406b, or the APP-4 tab 406c.

Thus, in various embodiments, an app, including an RIC app, may utilize the app API 374 as discussed above with reference to FIG. 4 to present a fully customizable user interface on the display panel 106 for displaying features specific to that app.

Figure 5:
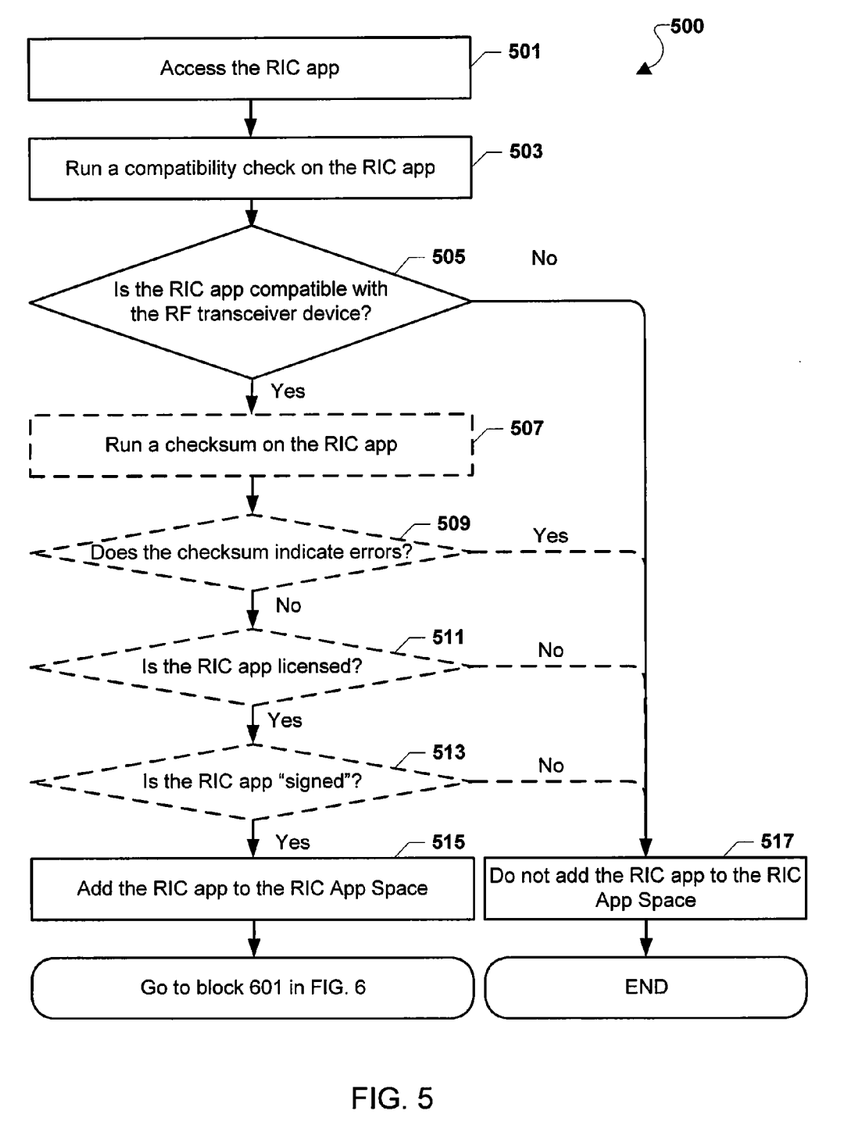
FIG. 5 is a process flow diagram illustrating an embodiment method for registering a reconfigurable integrated circuit application (RIC app) on a radiofrequency transceiver device.

FIG. 5 is a flow diagram illustrating an embodiment method 500 that may be implemented by a radiofrequency transceiver device 100 for registering an RIC app. In various embodiments, the device 100 may perform a "vetting" process in which the device tests the RIC app against various criteria before registering the RIC app for use with the radiofrequency transceiver device 100. This may be advantageous, for example, for RIC apps that are developed by third party developers. In some embodiments, an RIC app that is successfully registered may be added to an RIC App Space 395 such as described above with reference to FIG. 3B. In some embodiments, registering an RIC app may include moving the RIC app to a particular folder or location in the file system of the radiofrequency transceiver device 100. RIC apps that are not successfully registered may not be added to the RIC App Space 395. In some embodiments, only registered RIC apps may be allowed to execute on the radiofrequency transceiver device 100.

In block 501 of embodiment method 500, the radiofrequency transceiver device 100 may access the RIC app. For example, the radiofrequency transceiver device 100 may access the RIC app by accessing the RIC app's source code stored in memory on the radiofrequency transceiver device 100 or in memory stored on a network.

In block 503, the radiofrequency transceiver device 100 may run a compatibility check on the RIC app. The compatibility check may be performed by the system controller 314 of the radiofrequency transceiver device 100, such as described above with reference to FIGS. 3A-3B. The compatibility check may be used to determine whether the RIC app can run on the radiofrequency transceiver device 100. In one embodiment, running a compatibility check may include determining whether RIC configuration data included with the RIC app is compatible with the radiofrequency transceiver device 100.

In determination block 505, the system controller 314 may determine whether the RIC app is compatible with the radiofrequency transceiver device 100. In response to determining that the RIC app is not compatible with the radiofrequency transceiver device 100 (i.e., determination block 505="No"), the system controller 314 may not add the RIC app to the RIC App Space 395 in block 517. The device 100 may conclude performing the method 500. In response to determining that the RIC app is compatible with the radiofrequency transceiver device 100 (i.e., determination block 505="Yes"), the system controller 314 may optionally implement a checksum algorithm to check the RIC app's integrity using known methods in optional block 507. In an embodiment, the checksum procedure may reveal whether the app includes errors that may have been introduced when being loaded on the radiofrequency transceiver device 100.

In optional determination block 509, the system controller 314 may determine whether the checksum indicates any errors. In response to determining that the checksum indicates one or more errors (i.e., determination block 509="Yes"), the system controller 314 may not add the RIC app to the RIC App Space 395 in block 517. The device 100 may conclude performing the method 500. In response to determining that the checksum does not indicate any errors (i.e., determination block 509="No"), the system controller 314 may optionally determine whether the RIC app is licensed in optional determination block 511. In an embodiment, an RIC app may be "licensed" when the RIC app is purchased or obtained from an authorized software dealer. In various embodiments, only licensed RIC apps may be allowed to operate on the radiofrequency transceiver device 100.

In response to determining that the RIC app is not licensed (i.e., determination block 511="No"), the system controller 314 may not add the RIC app to the RIC App Space 395 in block 517. The device 100 may conclude performing the method 500. In response to determining that the RIC app is licensed (i.e., determination block 511="Yes"), the system controller 314 may optionally determine whether the RIC app is signed in optional determination block 513. In an embodiment, an RIC app may be "signed" when the RIC app includes some indicia of authenticity or a "signature." For example, the RIC app may include credentials that verify that the RIC app comes from a particular source.

In response to determining that the RIC app is not signed (i.e., determination block 513="No"), the system controller 314 may not add the RIC app to the RIC App Space 395 in block 517. The device 100 may conclude performing the method 500. In response to determining that the RIC app is signed (i.e., determination block 513="Yes"), the system controller 314 may add the RIC app to the RIC App Space 395 in block 515. This may include storing the RIC configuration data included in the RIC App in the RIC App Space. The RIC configuration data may include, for example, at least one semiconductor intellectual property (IP) core that may be loaded onto an RIC in the RIC module 364 during execution of the RIC app. In one embodiment, after the RIC App is added to the RIC App Space 395, the RIC App may be launched and run on the radiofrequency transceiver device 100, as described below with reference to FIG. 6.

In some embodiments, adding the RIC App to the RIC App Space 395 may include adding the RIC App to a user interface of the radiofrequency transceiver device 100. For example, an icon representing the RIC App may be displayed on a menu screen of the radiofrequency transceiver device 100 and may be selected by the user to launch the RIC App. In some embodiments, an app-specific user interface associated with the RIC App may be displayed on the display screen of the device 100 in response to launching the RIC App.

Figure 6:
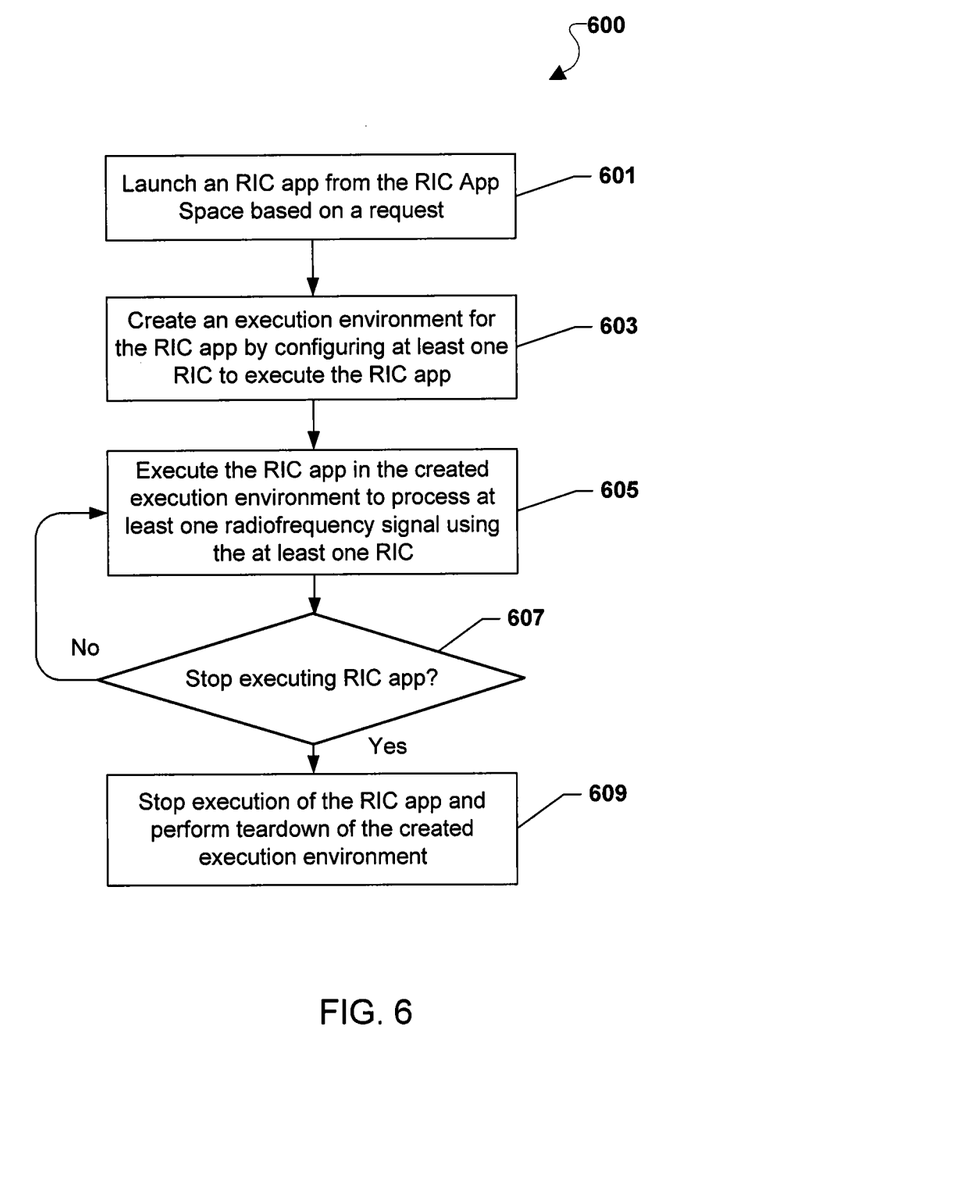
FIG. 6 is a process flow diagram illustrating an embodiment method for executing an RIC app on a radiofrequency transceiver device.

FIG. 6 is a flow diagram illustrating an additional embodiment method 600 that may be implemented by a radiofrequency transceiver device 100. In block 601 of method 600, an RIC App from the RIC App Space 395 may be launched based on a request. The request to launch the RIC App may be made, for example, by a user of the radiofrequency transceiver device 100 (e.g., in response to a user input received on a user interface of the device 100) or by an additional app. The additional app may be running on the radiofrequency transceiver device 100 or may be running on a different device, such as another radiofrequency transceiver device, which may communicate with the device 100 over a suitable link (e.g., via an Ethernet port). The additional app may be an app from the App Space 382 or an RIC app from the RIC App Space 395. As used herein, an additional RIC app may include an RIC app that is different from the RIC app that is requested to be launched, or may be another instance of the same RIC app, such as where a particular RIC app makes a request to launch another instance of itself.

In block 603, an execution environment for the RIC app may be created. In embodiments, the creation of an execution environment for the RIC app may be performed by the system controller 314 of the radiofrequency transceiver device 100. The creation of the execution environment may include reconfiguring at least one RIC to execute the RIC app. For example, the at least one MC (e.g., FPGA, CPLD, etc.) may be reconfigured by the system controller 314 based on configuration data included in or stored in association with the RIC app. The configuration data may be one or more stored intellectual property (IP) cores, for example, that may be loaded onto one or more RICs on the RIC module 364. The created execution environment may also facilitate data flow during the execution of the RIC app. For example, the created execution environment may establish input(s) and/or output(s) for the RIC app. Thus, the execution environment may facilitate communication of data between the RIC app and one or more other apps executing on the radiofrequency transceiver device 100.

In one embodiment, the RIC app may be launched in response to a request from another app (i.e., a requesting app) running on the radiofrequency transceiver device 100. The requesting app may identify data to be provided to the RIC app (e.g., a radiofrequency signal) to be processed by the RIC app using the at least one RIC. The requesting app may also specify an output destination for the data processed by the RIC app. The output destination may be, for example, the requesting app, another app running on the radiofrequency transceiver device 100 and/or a storage/retreival component of the device 100 (e.g., a hard drive). The system controller 314 may create the execution environment for the RIC app to facilitate the data flows to and/or from the RIC app as indicated by the requesting app.

In block 605, the RIC app may be executed in the created execution environment using at least one RIC. In embodiments, executing the RIC app may include processing at least one radiofrequency signal, which may be a digitized radiofrequency signal, using the at least one RIC. The processing of the at least one radiofrequency signal may include performing a transform on the at least one radiofrequency signal.

In determination block 607, the system controller 314 may determine whether to stop executing the RIC app on the at least one RIC. For example, the system controller may determine that the execution of the RIC app should be stopped based on a determination that the RIC app is finished processing the at least one radiofrequency signal. The execution of the RIC App may also be stopped based on a request to stop executing the RIC app made by another app or a by user (e.g., via a user input received at a user interface of the radiofrequency transceiver device). In response to determining that the execution of the RIC app should not be stopped (i.e., determination block 607="No"), the RIC app may continue to execute in the created execution environment in block 605. In response to determining that the execution of the RIC app should be stopped (i.e., determination block 607="Yes"), the system controller 314 may stop the execution of the RIC app and perform a teardown of the created execution environment in block 609. In one embodiment, performing a teardown of the execution environment may include de-allocating resources on the RIC module previously allocated for executing the RIC app and making these resources available to another RIC app.

Figure 7:
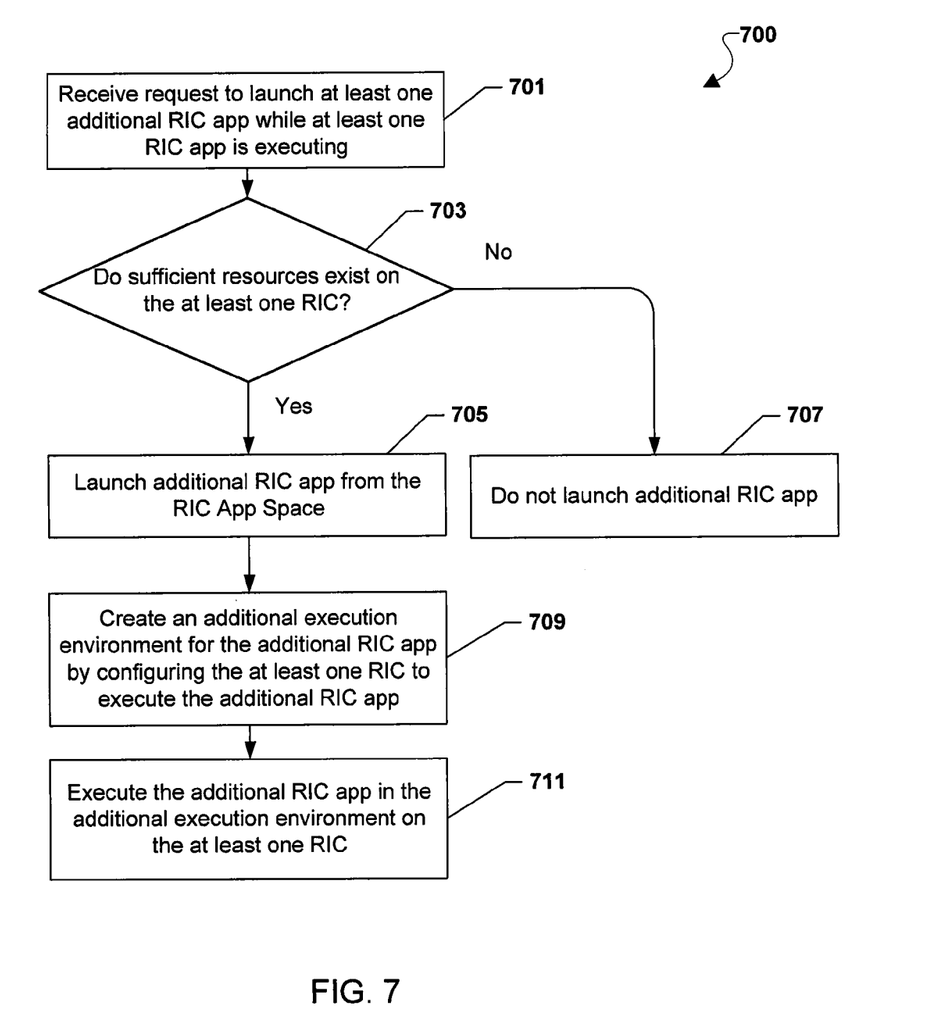
FIG. 7 is a process flow diagram illustrating an embodiment method for executing multiple RIC apps on a radiofrequency transceiver device.

In various embodiments, the system controller 314 of the radiofrequency transceiver device 100 may be configured to manage multiple RIC apps on the device. FIG. 7 is a flow diagram illustrating an embodiment method 700 for managing a plurality of RIC apps. In block 701, the system controller 314 may receive a request to launch at least one additional RIC app while at least one RIC app executes on the radiofrequency transceiver device 100. For example, a first RIC app may be executing in a first execution environment created by the system controller 314, as shown in block 605 of FIG. 6. A request to launch an additional (i.e., second) RIC app may be made by a user of the radiofrequency transceiver device 100 or by an additional app running on the radiofrequency transceiver device 100. In some embodiments, the request to launch the additional (i.e., second) RIC app may be made by first RIC app.

The additional (i.e., second) RIC app may be a different RIC App than the first RIC app executing on the device 100. Alternately, the additional RIC app may be the same RIC app as the first RIC app. For example, multiple copies of the same RIC app may execute simultaneously on the radiofrequency transceiver device 100 (e.g., using different portions of the RIC module), and may for instance perform similar or identical processing tasks on different radiofrequency signals.

In determination block 703, the system controller 314 may determine whether sufficient resources exist to execute the additional RIC app on the at least one RIC of the radiofrequency transceiver device 100. In embodiments, determining whether sufficient resources exist may include determining whether sufficient space exists on the at least one RIC to reconfigure the at least one RIC based on RIC configuration data associated with the additional RIC app.

In response to determining that sufficient resources do not exist on the at least one RIC to execute the additional RIC app (i.e., determination block 703="No") the system controller 314 may not launch the additional RIC app in block 707. In response to determining that sufficient resources do exist on the at least one RIC to execute the additional RIC app (i.e., determination block 703="Yes"), the system controller 314 may launch the additional RIC app in block 705. In block 709, the system controller 314 may create an additional execution environment for the additional RIC app, where creating the additional execution environment may include reconfiguring at least one RIC to execute the at least one additional RIC app using the RIC configuration data associated with the additional RIC app. In block 711, the additional RIC app may execute in the additional execution environment on the at least one RIC. The first RIC app may continue to execute in the first execution environment on the at least one RIC (i.e., in parallel with the execution of the additional RIC).

Thus, in various embodiments, multiple RIC apps may execute simultaneously on the at least one RIC of the radiofrequency transceiver device 100. The system controller 314 may continue to receive requests to launch additional RIC apps. For each additional RIC app, the system controller 314 may determine whether sufficient resources exist to execute a given RIC app on the at least one RIC, and an execution environment for the RIC app may be created only in response to determining that sufficient resources exist to execute the RIC app on the at least one RIC.

Figure 8:
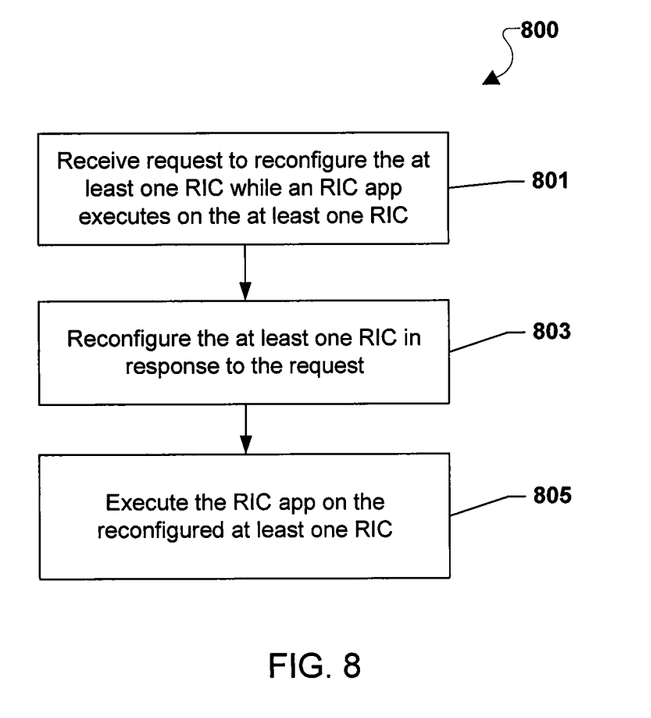
FIG. 8 is a process flow diagram illustrating an embodiment method for reconfiguring at least one RIC while an RIC app executes on the at least one RIC.

Various embodiments may also include dynamic reconfiguration of the at least one RIC while an RIC app is executing. FIG. 8 is a flow diagram illustrating an embodiment method 800 for reconfiguring at least one RIC while an RIC app executes on the at least one RIC. In block 801, the system controller 314 may receive a request to reconfigure the at least one RIC while an RIC app executes on the at least one RIC. The request to reconfigure the at least one RIC may be made by a user of the radiofrequency transceiver device 100, by the RIC app itself or by another app running on the radiofrequency transceiver device 100. For example, the RIC app may process data (e.g., digitized radiofrequency signals) using an initial configuration of the at least one RIC. A second app, which may be receiving the data processed by the RIC app, may request that the RIC app modify one or more parameters of the processing of the radiofrequency signals, which may include reconfiguring of the at least one RIC on which the RIC app is executing. In block 803, the system controller 314 may reconfigure the at least one RIC in response to the request. In block 805, the RIC app may execute on the reconfigured at least one RIC.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of managing a reconfigurable integrated circuit application (RIC app) in an RIC app storage and retrieval space (RIC App Space) comprising a plurality of RIC apps on a radiofrequency transceiver device having at least one of a receiver for receiving radiofrequency signals and a transmitter for transmitting radiofrequency signals, the radiofrequency transceiver device having one or more reconfigurable integrated circuits (RICs) and a system controller, the method comprising:
    launching, by the system controller, a first RIC app of the plurality of RIC apps from the RIC App Space on the radiofrequency transceiver device based on a request;
    creating an execution environment, by the system controller, for the first RIC app, wherein creating the execution environment comprises reconfiguring the at least one RIC, by the system controller, to execute the first RIC app; and executing the first RIC app in the created execution environment, wherein executing the first RIC app comprises processing at least one radiofrequency signal using the at least one RIC.

2. The method of claim 1, wherein the at least one radiofrequency signal comprises at least one digitized radiofrequency signal.

3. The method of claim 1, wherein processing the at least one radiofrequency signal comprises performing a transform on the at least one radiofrequency signal.

4. The method of claim 1, wherein the at least one radiofrequency signal is received by, stored on, retrieved from, and/or transmitted by the radiofrequency transceiver device.

5. The method of claim 1, wherein the at least one RIC comprises at least one field-programmable gate array (FPGA).

6. The method of claim 1, wherein the at least one RIC comprises at least one complex programmable logic device (CPLD).

7. The method of claim 1, further comprising:
receiving, by the system controller, a request to reconfigure the at least one MC while the first RIC app executes on at least one RIC;
reconfiguring, by the system controller, the at least one RIC in response to the request; and
executing the first RIC app on the at least one reconfigured RIC.

8. The method of claim 1, wherein the request to launch the first RIC app is made by at least one of an additional app and a user of the radiofrequency transceiver device.

9. The method of claim 8, wherein the first RIC app is launched from the RIC App Space based on a request from an additional app, and at least one of:
  (i) the additional app identifies the at least one radiofrequency signal to be processed by the first RIC app using the at least one RIC;
  (ii) the at least one radiofrequency signal processed by the first RIC app using the at least one RIC is sent to the additional app;
  (iii) data derived from the processing of the at least one radiofrequency signal by the first RIC app using the at least one RIC is provided to the additional app;
  (iv) the additional app executes on the radiofrequency transceiver device; and
  (v) the additional app executes on a second device that communicates the request to the radiofrequency transceiver device.

10. The method of claim 1, further comprising:
stopping the execution of the first RIC app based on at least one of:
  (i) a determination that the first RIC app is finished processing the at least one radiofrequency signal;
  (ii) a request to stop the execution of the first RIC app made by at least one of an additional app and a user of the radiofrequency transceiver device; and
performing a teardown of the created execution environment when it is determined that the first RIC app is stopped executing.

11. The method of claim 1, wherein the created execution environment facilitates at least one input and at least one output for the first RIC app.

12. A method of managing a reconfigurable integrated circuit application (RIC app) in an RIC app storage and retrieval space (RIC App Space) comprising one or more RIC apps on a radiofrequency transceiver device having at least one of a receiver for receiving radiofrequency signals and a transmitter for transmitting radiofrequency signals, the radiofrequency transceiver device having one or more reconfigurable integrated circuits (RICs) and a system controller, the method comprising:
launching an RIC app from the RIC App Space on the radiofrequency transceiver device based on a request;
creating an execution environment, by the system controller, for the RIC app, wherein creating the execution environment comprises reconfiguring the at least one RIC, by the system controller, to execute the RIC app; and
executing the RIC app in the created execution environment by processing at least one radiofrequency signal using the at least one RIC, wherein:
the method further comprises registering the RIC app, wherein registering the RIC app comprises:
determining, by the system controller, whether the RIC app can run on the radiofrequency transceiver device;
adding the RIC app to the RIC App Space when it is determined that the RIC app can run on the radiofrequency transceiver device; and
not adding the RIC app to the RIC App Space when it is determined that the RIC app cannot run on the radiofrequency transceiver device.

13. The method of claim 12, wherein determining whether the RIC app can run on the radiofrequency transceiver device comprises:
determining, by the system controller, whether RIC configuration data included in the RIC app is compatible with the radiofrequency transceiver device; and wherein registering the RIC app further comprises:
storing the RIC configuration data included in the RIC app in the RIC App Space in response to determining that the RIC configuration data is compatible with the radiofrequency transceiver device, wherein the RIC configuration data comprises at least one semiconductor intellectual property (IP) core.

14. The method of claim 12, wherein registering the RIC app further comprises adding the RIC app to a user interface of the radiofrequency transceiver device, the method further comprising:
displaying an app-specific user interface associated with the RIC app in response to launching the RIC app.

15. The method of claim 12, wherein the system controller determines that the RIC app cannot run on the radiofrequency transceiver device when at least one of:
a checksum algorithm run on the RIC app indicates at least one error;
the RIC app is not licensed; and
the RIC app is not signed.

16. A method of managing a reconfigurable integrated circuit application (RIC app) in an RIC app storage and retrieval space (RIC App Space) comprising one or more RIC apps on a radiofrequency transceiver device having at least one of a receiver for receiving radiofrequency signals and a transmitter for transmitting radiofrequency signals, the radiofrequency transceiver device having one or more reconfigurable integrated circuits (RICs) and a system controller, the method comprising:
launching an RIC app from the RIC App Space on the radiofrequency transceiver device based on a request;
creating an execution environment, by the system controller, for the RIC app, wherein creating the execution environment comprises reconfiguring the at least one RIC, by the system controller, to execute the MC app; and executing the RIC app in the created execution environment by processing at least one radiofrequency signal using the at least one RIC, wherein the RIC app comprises a first RIC app executing in a first execution environment;

launching at least one additional RIC app from the RIC App Space on the radiofrequency transceiver device based on a request;

creating at least one additional execution environment, by the system controller, for the at least one additional RIC app, wherein creating the at least one additional execution environment comprises reconfiguring at least one RIC, by the system controller, to execute the at least one additional MC app using the MC configuration data associated with the at least one additional RIC app; and executing the at least one additional RIC app in the at least one additional execution environment on the at least one RIC.

17. The method of claim 16, wherein for each MC app launched from the MC App Space, the method further comprises:

determining, by the system controller, whether sufficient resources exist to execute the RIC app on the at least one RIC, wherein the execution environment for the RIC app is created only in response to determining that sufficient resources exist to execute the MC app on the at least one RIC.

18. The method of claim 17, wherein determining whether sufficient resources exist comprises determining whether sufficient space exists on the at least one RIC to reconfigure the at least one RIC based on the RIC configuration data associated with the MC app.

19. A radiofrequency transceiver device having at least one of a receiver for receiving radiofrequency signals and a transmitter for transmitting radiofrequency signals, the radiofrequency transceiver device comprising:

at least one reconfigurable integrated circuit (RIC);
a memory; and
a processor coupled to the memory and to the at least one RIC, wherein the processor is configured with processor-executable instructions to perform operations comprising:

launching, by a system controller, a first reconfigurable integrated circuit application (RIC app) from an RIC app storage and retrieval space (RIC App Space) comprising a plurality of RIC apps on the radiofrequency transceiver device based on a request;

creating an execution environment for the first RIC app, wherein creating the execution environment comprises reconfiguring the at least one RIC to execute the first RIC app; and executing the first RIC app in the created execution environment, wherein executing the RIC app comprises processing at least one radiofrequency signal using the at least one RIC.

20. A radiofrequency transceiver device having at least one of a receiver for receiving radiofrequency signals and a transmitter for transmitting radiofrequency signals, the radiofrequency transceiver device comprising:

means for launching, by a system controller, a first reconfigurable integrated circuit application (RIC app) from an RIC app storage and retrieval space (RIC App Space) comprising a plurality of RIC apps on the radiofrequency transceiver device based on a request;

means for creating an execution environment for the first RIC app, wherein means for creating the execution environment comprises means for reconfiguring the at least one RIC to execute the first RIC app; and means for executing the first RIC app in the created execution environment, wherein means for executing the first RIC app comprises means for processing at least one radiofrequency signal using the at least one RIC.

* * * * *